US008064352B2

(12) United States Patent
Liu et al.

(10) Patent No.: US 8,064,352 B2
(45) Date of Patent: Nov. 22, 2011

(54) METHOD FOR IMPLEMENTING ONLINE MAINTENANCE IN COMMUNICATION NETWORK

(75) Inventors: Liyuan Liu, Shenzhen (CN); Bo Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 997 days.

(21) Appl. No.: 11/948,531

(22) Filed: Nov. 30, 2007

(65) Prior Publication Data

US 2008/0112543 A1 May 15, 2008

Related U.S. Application Data

(63) Continuation of application No. PCT/CN2006/000803, filed on Apr. 26, 2006.

(30) Foreign Application Priority Data

Jun. 3, 2005 (CN) .......................... 2005 1 0074891

(51) Int. Cl.
*G01R 31/08* (2006.01)
(52) U.S. Cl. ........ 370/242; 370/216; 370/248; 370/250; 370/252; 709/224
(58) Field of Classification Search .......... 370/216–228, 370/241–258; 709/223–226
See application file for complete search history.

(56) References Cited

U.S. PATENT DOCUMENTS

| 6,721,284 | B1 * | 4/2004 | Mottishaw et al. .......... 370/255 |
| 7,475,003 | B1 * | 1/2009 | Madhusudhana et al. .... 709/223 |
| 7,599,359 | B1 * | 10/2009 | Croak et al. .................. 370/356 |
| 7,616,579 | B2 * | 11/2009 | Slattery et al. ................ 370/241 |
| 2002/0022473 | A1 * | 2/2002 | Takagi et al. .................. 455/405 |
| 2002/0055879 | A1 * | 5/2002 | Wengrovitz et al. ........... 705/26 |
| 2003/0101357 | A1 | 5/2003 | Ronen et al. |
| 2003/0235280 | A1 * | 12/2003 | Shafie-Khorasani et al. ......................... 379/112.01 |
| 2004/0228327 | A1 | 11/2004 | Punjabi et al. |
| 2005/0015253 | A1 | 1/2005 | Rambo et al. |
| 2005/0097209 | A1 * | 5/2005 | McDonagh et al. .......... 709/224 |
| 2008/0123535 | A1 * | 5/2008 | Saito et al. .................... 370/241 |

FOREIGN PATENT DOCUMENTS

CN 1490982 A 4/2004
(Continued)

OTHER PUBLICATIONS

Written Opinion of the International Searching Authority in corresponding PCT Application No. PCT/CN2006/000803 (Aug. 10, 2006).

(Continued)

*Primary Examiner* — Christopher Grey
(74) *Attorney, Agent, or Firm* — Leydig, Voit & Mayer, Ltd.

(57) ABSTRACT

A method of implementing online maintenance in communication network, includes: recording, in any communication device of the communication network, communication data going through the communication device itself when the communication device has detected online a maintenance request; collecting, by an online maintenance server set in the communication network, online the communication data recorded in all the communication devices, and analyzing the communication data to find out a fault reason of the communication network. In the method, communication devices are triggered via a maintenance request to objectively record communication data, and an online maintenance server is set for analyzing the collected communication data to find out the fault reason. In this way, the communication procedure and maintenance procedure are separately performed, which is convenient for the communication service provider to solve problems.

12 Claims, 1 Drawing Sheet

FOREIGN PATENT DOCUMENTS

| | | | |
|---|---|---|---|
| CN | 1529455 | A | 9/2004 |
| CN | 1564488 | A | 1/2005 |
| CN | 1578202 | A | 2/2005 |
| CN | 100450016 | C | 1/2009 |
| EP | 0 948 165 | A1 | 10/1999 |
| EP | 1 156 621 | A2 | 11/2001 |
| JP | 2004-260729 | A | 9/2004 |

OTHER PUBLICATIONS

International Search Report in corresponding PCT Application No. PCT/CN2006/000803 (Aug. 10, 2006).

1st Office Action in corresponding Chinese Application No. 200510074891.6 (Nov. 30, 2007).

* cited by examiner

METHOD FOR IMPLEMENTING ONLINE MAINTENANCE IN COMMUNICATION NETWORK

CROSS REFERENCE TO RELATED APPLICATIONS

This application is a continuation of International Patent Application No. PCT/CN2006/000803, filed Apr. 26, 2006, which claims priority to Chinese Patent Application No. 200510074891.6, filed Jun. 3, 2005, both of which are hereby incorporated by reference.

FIELD OF THE TECHNOLOGY

The present invention relates to the maintenance of communication services, more particularly to a method for implementing online maintenance in the communication network.

BACKGROUND OF THE INVENTION

During the usage procedure of communication services such as telephone call and netmeeting, faults like communication quality decrease can easily happen, for instance, noises come out during the calling process, sound volume of the call turns lower suddenly, etc. Although such fault will not lead to interrupt of communication procedure, it will make users of the communication services uncomfortable, even influence the users' normal communication, thereby bringing inconvenience to the users.

At present, communication service provider provides a simple maintenance method for such fault, of which the specific course is: when encountering a fault, the user can dial the maintenance number and report the fault phenomenon to a customer service representative provided by the communication service provider; and the communication service provider finds out the fault reason according to the user's description, thus maintaining the communication service quality.

However, because the user may be in communication procedure when he is aware of the fault, in order to report the fault phenomenon to the communication service provider, the user has to wait current talk to end or stop current talk for the time being. Furthermore, when the user dials the maintenance number to complain, the communication procedure with the fault has been over, and the communication service provider cannot recover the communication devices' working condition in the communication network when the fault happens. Therefore, the method is of low real-time quality and is not good for the communication service provider to find out the fault reason exactly and quickly or to prevent the fault from happening again.

In addition, the fault phenomenon obtained by the communication service provider is orally described by users, and most of the descriptions reflect the users' feeling when encountering communication faults, so the descriptions cannot be the basis for determining the fault reason, which brings much difficulty for the communication service provider when solving problems.

In another word, the existing maintenance method is not good for maintaining communication services effectively, thus affects the raising of users' satisfaction and is not good for the users to get better maintenance service.

SUMMARY

Embodiments of the present invention are to provide a method of implementing online maintenance in communication network, so as to raise the ability of communication service provider for finding fault reasons and enable the communication service provider to provide more exact and satisfactory maintenance for users.

The technical schemes of the present invention are implemented as follows:

A method for implementing online maintenance in communication network includes:

collecting, by an online maintenance server, communication data recorded in part of or all communication devices in the communication network during the communication procedure; and analyzing the communication data to find out a fault reason of the communication network.

An online maintenance server includes:

means for collecting communication data from any communication device in a communication network during the communication procedure; and means for analyzing the communication data to find out a fault reason of the communication network.

A communication device for implementing online maintenance includes:

means for detecting a maintenance request during the communication procedure; and means for recording communication data going through the communication device itself when the maintenance request has been detected.

A user terminal includes:

means for communication with a communication device in the communication network; and means for sending a maintenance request to the communication device during the communication procedure.

It can be seen from the above technical schemes that, in the method for implementing online maintenance in communication network, the user triggers online the communication devices to objectively record communication data, so as to collect necessary device information more accurately and timely. Moreover, an online maintenance server is set up for analyzing the collected communication data to find out the fault reason, so as to decrease difficulty of locating the fault for the communication service provider, reduce maintenance cost and increase the users' satisfaction.

On the other hand, in the method of implementing online maintenance provided in embodiments of the present invention, device information can be recorded real-timely during the communication procedure, and users need not stop the communication procedure for maintenance, which makes the communication procedure and maintenance procedure not interfere with each other and brings convenience for the communication service provider to solve problems.

EMBODIMENTS OF THE INVENTION

The present invention will be described in detail hereinafter with reference to some drawings and embodiments.

Figure 1:
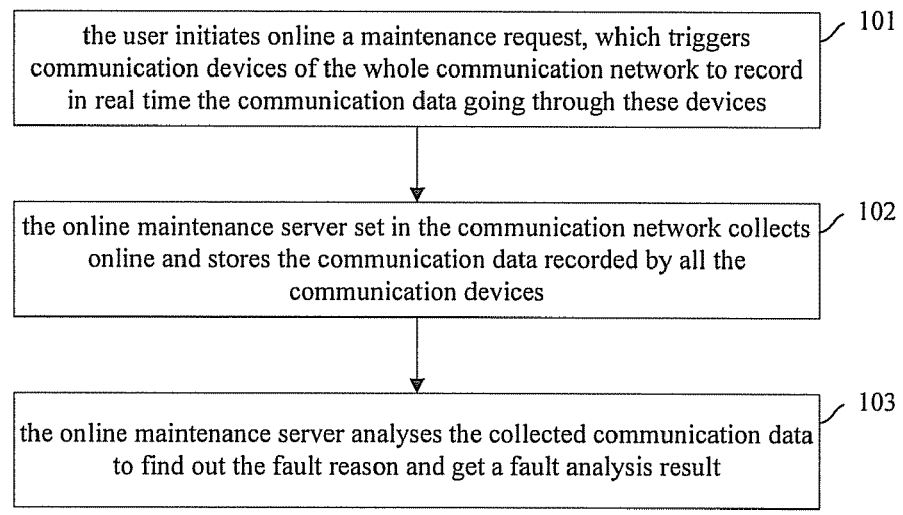
FIG. 1 is a flowchart illustrating an online maintenance method of the present invention.

An embodiment of the online maintenance method of the present invention is shown in FIG. 1, which includes the following processes.

Block 101: a user sends a maintenance request online when the user is aware of a fault, which triggers communication devices of the whole communication network to real-timely record communication data going through the devices themselves.

In the process, following approaches may be adopted for the user to send out the maintenance request online and trigger recording of communication data in the communication network.

The first approach: if the user utilizes an ordinary phone or Ethernet phone (Ephone), the user can hold the talk when encountering a fault and dial the online maintenance number provided by the communication service provider upon the telephone dial board. The ordinary phone that the user utilizes converts the dialed number into a Dual Tone Multiple Frequency (DTMF) sequence and sends the sequence out. The communication devices in the communication network, which are able to detect the DTMF sequence, may record the communication data going through the devices after detecting the DTMF sequence.

The communication devices are divided into two classes, i.e., control device and non-control device, according to their working mechanisms. Non-control device can detect the DTMF sequence, and most of the communication devices in the communication network are non-control device. Since control device is only responsible for command control in the communication network, it cannot detect the DTMF sequence. Therefore, after detecting the DTMF sequence, a non-control device at the antero level of a control device is required to send a command to the control device, so as to trigger recording of communication data going through the control device during the communication procedure.

The second approach: a maintenance request key is set on the user's terminal device. When the user encounters a fault, the user can hold the talk while pressing the maintenance request key at the same time. When detecting the maintenance command sent by the user pressing the key, the terminal device records the communication data going through itself during the communication procedure, and sends a signaling request to a posterior level communication device. Because each communication device is located at a specified position and the devices are connected consecutively in the communication network, all the communication devices form an antero-posterior relation in terms of connection. Therefore, after detecting the signaling request sent from the antero level device, every communication device will record communication data going through the device itself during the communication procedure and send a singling request to the posterior level communication device.

The third approach: if the user adopts a soft terminal run on a computer, which is similar to Netmeeting, the user can send online a maintenance command by clicking a menu, wherein the process for the user to trigger the recording of communication data in the communication network is the same as the trigger process in the second approach, which is not described any more hereby.

The communication data includes: data sent by communication devices according to protocols, maintenance information or operation commands defined by communication devices and so on. As to different communication devices, the data sent according to protocols are different. For instance, communication data recorded in an Integrated Access Device (IAD) are analog line signals, encoded/decoded voice packages and signaling packages; communication data recorded in a Trunking Media Gateway (TMG) are trunking line signals, encoded/decoded voice packages and signaling packages; communication data recorded in a switch are analog line signals, trunking line signals and singling packages.

Block 102: an online maintenance server is set in the communication network, and the online maintenance server collects online and stores communication data of all the communication devices.

In practical application, the online maintenance server is connected to all the communication devices through IP network, and methods for collecting communication data online is as follows:

Method 1: communication devices in the communication network record the communication data going through the devices themselves during the communication procedure, and send the recorded communication data to the online maintenance server through IP network.

In the method, each of the communication devices adds a global unique identifier into the recorded communication data for distinguishing different communication procedures, encapsulates the communication data into an IP package according to IP protocol and sends out the IP package whose target address is the IP address of the online maintenance server.

In practical application, there are various ways to form a global unique identifier. More specifically, the global unique identifier is composed of type and content corresponding to the type. For instance, the global unique identifier includes device type and device identity, or source type and source identity, or destination type and destination identity, or data type and data identity, or any combination of the above mentioned four kinds of identifiers.

Device type and device identity are used to distinguish different communication devices, so as to determine from which communication device the communication data received by the online maintenance server is reported.

Source type, source identity, destination type and destination identity are used to distinguish communication data transmitted during multiple communication procedures between two communication devices.

Data type and data identity are used to describe type of the communication data and check whether the distinguish result is right, according to source type, source identity, destination type and destination identity. In some special applications, source type, source identity, destination type and destination identity of all the communication data transmitted during different communication procedures are the same, then the online maintenance server may further get the distinguish result according to data type and data identity.

When the device type is IP device, the device identity is an IP address of the device; when the source type is user, the source identity is a user identity; when the destination type is IP, the destination identity is an IP address; when the data type is Real-time Transport Protocol (RTP), the data identity is an SSRC identifier.

Figure 2:
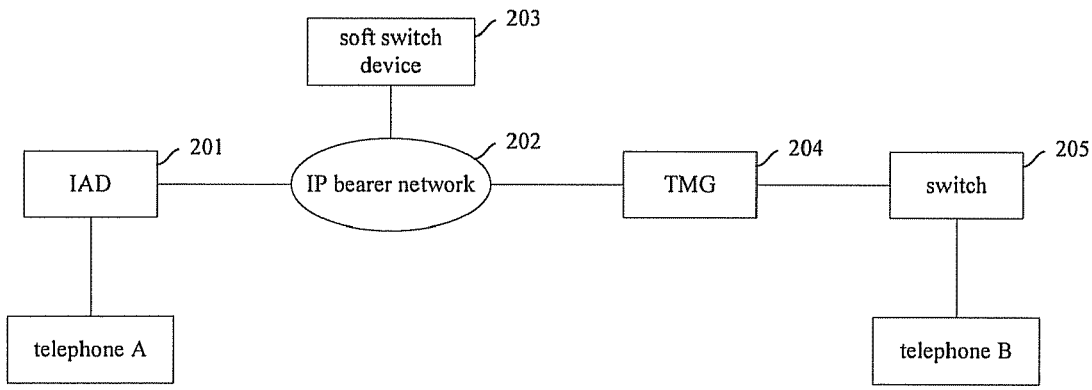
FIG. 2 is a diagram illustrating connection of the communication network adopted in one embodiment of the present invention.

With reference to FIG. 2, the method of setting a global unique identifier will be illustrated in detail hereinafter, wherein the global unique identifier is set for the communication data reported during one communication procedure from all the communication devices of the communication network. The network connections shown in FIG. 2 are as follows: when telephone A and telephone B are in the course of communication, telephone A sends an analogy line signal to the IP carrier network 202 through the IAD 201; the soft switch device 203 is responsible for providing routing and connection control on voice service for the IP carrier network 202; after receiving an IP package sent from the IP carrier network 202, the TMG 204 reverts the IP package into a trunking signal and transmits the trunking signal to the switch 205, and then the switch 205 transmits an analogy line signal to telephone B.

The global unique identifier of the analogy data entering the IAD through a telephone line is composed of eight parts, which are "IP", an IP address and port number of the IAD like 1.1.1.1+2427, "analogy user line", a user identity like aaln/0@exampleIAD0.com, "IP", an RTP address and port number adopted in the talk like 1.1.1.1+1111, "analogy user line" and a user identity like aaln/0@exampleIAD0.com.

The global unique identifier of the encoded data transmitted from the IAD to the TMG is composed of eight parts, which are "IP", an IP address and port number of the IAD like 1.1.1.1+2427, "IP", an RTP source address and port number adopted in the talk like 1.1.1.1+1111, "IP", an RTP destination address and port number adopted in the talk like 2.2.2.2+2222, "RTP" and an SSRC of the RTP stream.

The global unique identifier of the encoded data received by the TMG is composed of eight parts, which are "IP", an IP address and port number of the TMG like 2.2.2.2+2427, "IP", an RTP source address and port number adopted in the talk like 1.1.1.1+1111, "IP", an RTP destination address and port number adopted in the talk like 2.2.2.2+2222, "RTP" and an SSRC of the RTP stream.

The global unique identifier of the decoded trunking data transmitted from the TMG to the switch is composed of eight parts, which are "IP", an IP address and port number of the TMG like 2.2.2.2+2427, "IP", an RTP address and port number adopted in the talk like 2.2.2.2+2222, "trunking", a trunking circuit number, "trunking" and a trunking circuit number.

As far as analogy line and trunking line are concerned, since physical lines are fixedly connected, identities of both ends of the analogy line and that of the trunking line are consistent respectively. As far as IP line is concerned, source identity and destination identity of the IP line are different.

It can be seen from the above mentioned setting method that, although different communication devices may set different global unique identifiers for communication data of the same communication procedure, the online maintenance server can still select the communication data belonging to the same communication procedure according to the association among the different global unique identifiers, that is, global unique identifier(s) is used to uniquely identify certain communication procedure. For instance, communication data of different communication procedures are transmitted between the IAD and the TMG, and because RTP addresses of these communication data are different, namely different communication procedures adopt different port numbers, the communication data of different communication procedures can be distinguished according to the above mentioned RTP addresses. Furthermore, the online maintenance server may find the communication data belonging to the same communication procedure according to source type, source identity, destination type and destination identity included in the global unique identifiers. In some special applications, a plurality of RTP streams may be born in the same address, in another word, the communication data of different communication procedures have the same RTP address. However, since the communication data of different communication procedures have different SSRCs, the online maintenance server can still distinguish the communication data of different communication procedures according to data type and data identity in the global unique identifiers.

Figure 3:
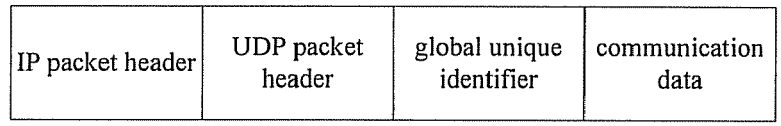
FIG. 3 is a diagram illustrating the IP package format in one embodiment of the present invention.

When encapsulating the data according to IP protocols, the communication device can select either Transfer Control Protocol (TCP) or User Datagram Protocol (UDP), and set data port and package format so that the online maintenance server can parse the data according to the given format. The IP package may have various formats. One of the formats of the IP package is shown in FIG. 3, which adopts UDP protocol and includes an IP header, a UDP header, a global unique identifier and communication data.

The communication device can copy those communication data going through the device itself and send the copied data to the online maintenance server during the communication procedure. Therefore, the online maintenance server is able to collect information online.

Method 2: when the communication device in the communication network records the communication data going through the device itself, the communication data are firstly stored in the communication device locally. After receiving a maintenance data collect request sent from the online maintenance server, the communication device transmits the stored communication data to the online maintenance server. Processes of transmitting the communication data are the same as those of method 1, which are not illustrated hereby.

Block 103: the online maintenance server analyzes the collected communication data to find out a fault reason and obtains a fault analysis result.

Firstly, the online maintenance server starts the fault reason analysis. It should be noted that, the online maintenance server can start the analysis in real time or at a fixed time, or the fault reason analysis on the online maintenance server can be started by external commands like an administrator command and so on. Also, the fault reason analysis on the online maintenance server can be started by a warning message sent from a communication device. For instance, the communication device detects the packet loss rate in a Real-time Transport Control Protocol (RTCP) message, and if the packet loss rate exceeds a set value, it manifests that there may be a fault leading to a communication quality decrease in the communication network. When detecting the above-mentioned situation, the communication device will send a warning message to the online maintenance server to start the fault reason analysis.

Secondly, the online maintenance server analyzes the collected communication data to find the fault reason for practical communication network. As to different communication networks, the online maintenance server has different analytical strategies.

Taking the communication network shown in FIG. 2 as example again, the method of analyzing the fault reason on the online maintenance server will be illustrated in detail hereinafter.

In block 102, the communication data reported to the online maintenance server by the IAD, the soft switch device, the TMG and the switch all carry global unique identifiers identifying the communication procedure. The online maintenance server finds communication data belonging to the same communication procedure according to the global unique identifiers, and determines whether the communication data transmitted from any two adjacent communication devices are the same. The online maintenance server can determine any two adjacent communication devices according to IP addresses of the communication devices from which the communication data have been transmitted. It is assumed that the communication data recorded by the IAD, the soft switch device, the TMG and the switch are respectively data1, data2, data3 and data4, wherein the communication data data1 recorded by the IAD includes the received media stream information data11 and transmitted media stream information data12, the communication data data3 recorded by the TMG includes the received media stream information data31 and transmitted media stream information data32. Because the IAD and the TMG are adjacent communication devices, the online maintenance server compares the media stream information data12 transmitted by the IAD and the media stream information data31 received by the TMG to find out whether they are the same. If both the media stream information going through the IAD and that going through the TMG are transported in the RTP manner, the online maintenance server can judge if the media stream information data12 and the media stream information data31 are the same by comparing the payloads in the RTP packages.

When the online maintenance server finds that the media stream information data12 and the media stream information data31 are different after the comparison, the online maintenance server can determine that the fault reason lies in the IP bearer network between the IAD and the TMG. That is because the IAD and the TMG are connected only through the IP bearer network without any other communication device in between. Further, it is applicable to determine at which specific device in the IP bearer network the fault has occurred by adopting the same method. The specific device in the IP bearer network includes routers, switches and so on.

The online maintenance server can also analyze the fault reason by another method, i.e., comparing the received communication data with a predefined rule. For example, when a call is being established between an IAD and a TMG, the message released by a soft switch device should be fixed. Therefore, if the online maintenance server detects that the message sent to the IAD by the soft switch device does not accord with the predefined rule, the online maintenance server can determine that a fault lies in the soft switch device. For another example, the number of RTP packages sent by a communication device for a communication procedure during a period of time is prescribed in a protocol, so the online maintenance server can, according to the time stamp in the RTP packages, figure out whether the number of RTP packages sent by the communication device during the period of time is the same as that prescribed in the protocol. If the two numbers are different, it means that a fault lies in the communication device.

After finding out the fault reason, one method is that the online maintenance server sends a command to the communication device with a fault, and the communication device automatically eliminates the fault. However, the method is usually not adopted because it will probably lead to serious mistaken operations. Another method is that the administrator manually eliminates the fault and realizes the maintenance according to the fault reason and based on practical conditions. Also, the communication service provider can transform the obtained fault reason into maintenance statistic data and, according to the maintenance statistic data, make a performance report for the communication network.

It can be seen from the above embodiments that, in the method of implementing online maintenance for communication network in the present invention, the user triggers communication devices to objectively record communication data, and the online maintenance server is set to analyze the collected communication data to find out the fault reason. Therefore, the communication procedure and maintenance procedure are separated without interference, thus making it convenient for the communication service provider to solve problems.

The invention claimed is:

1. A method for implementing online maintenance in communication network, comprising:
   detecting, by a communication device of the communication network, during a communication procedure a maintenance request sent from a user terminal;
   recording, in the communication device, communication data going through the communication device itself when the communication device has detected the maintenance request;
   collecting, by an online maintenance server, the communication data recorded in part of or all communication devices in the communication network during the communication procedure; and
   analyzing the communication data to find out a fault reason of the communication network;
   wherein the collecting communication data during the communication procedure comprises:
   sending, from the online maintenance server, a maintenance data collect request to the communication device;
   encapsulating, by the communication device, the recorded communication data going through the communication device itself during the communication procedure into an IP package after receiving the maintenance data collect request, and sending an IP packet to the online maintenance server;
       wherein the IP package comprises: an IP header, a global unique identifier and communication data and
   wherein the analyzing the communication data to find out the fault reason of the communication network comprises:
   starting, by the online maintenance server, fault reason analysis;
   selecting two communication data from the collected communication data for comparison, wherein the two communication data carry global unique identifiers indicating the same communication procedure and are sent from two adjacent communication devices in the communication network, respectively; and
   determining, by the online maintenance server, that a fault lies in the communication devices having sent the two communication data when the two communication data are different.

2. The method according to claim 1, wherein collecting communication data during the communication procedure comprises:
   encapsulating, by any communication device in the communication network, the recorded communication data going through the communication device itself during the communication procedure into an IP package, setting a target address of the IP package to be the address of the online maintenance server and sending the IP package;
   receiving, by the online maintenance server, during the communication procedure the IP package whose target address is the same as the address of the online maintenance server.

3. The method according to claim 1, wherein the global unique identifier comprises at least one of the following identifiers: data type and data identity, source type and source identity, destination type and destination identity, device type and device identity.

4. The method according to claim 1, wherein analyzing the communication data to find out the fault reason of the communication network comprises:
   starting, by the online maintenance server, fault reason analysis;

comparing sending condition of the communication data with a preset rule; and determining, according to a comparing result, whether there is a fault in the communication device having sent the communication data.

5. The method according to claim 4, wherein the preset rule is a preset number of packages sent during a preset period of time; and judging whether there is a fault in the communication device comprises:

figuring out, by the online maintenance server, number of packages practically sent by the communication device during the preset period of time;

determining that there is no fault in the communication device when the number of packages practically sent by the communication device is the same as the preset number of packages.

6. The method according to claim 4, wherein the preset rule comprises a communication protocol; and judging whether there is a fault in the communication device comprises:

comparing, by the online maintenance server, the received communication data with packages defined in the communication protocol;

determining that the communication device having sent the communication data has a fault when the received communication data and the packages are different.

7. The method according to claim 1, wherein the online maintenance server starts the fault reason analysis in real time or at a fixed time.

8. The method according to claim 1, wherein the online maintenance server starts the fault reason analysis according to an external command or according to a warning message sent from any communication device of the communication network.

9. The method according to claim 1, further comprising:

converting, by a user terminal, a dialed number into a Dual Tone Multiple Frequency (DTMF) sequence when the user terminal is dialed; and transmitting, via the user terminal, the DTMF sequence to the communication device as the maintenance request.

10. The method according to claim 1, further comprising:

initiating, by a user terminal, a maintenance command to the communication device as the maintenance request when a preset key of the user terminal is pressed.

11. The method according to claim 1, wherein the maintenance request the communication device detects is a Dual Tone Multiple Frequency sequence converted from a dialed number, or is a maintenance command initiated via pressing a key.

12. A communication system comprising:

a user terminal;

an online maintenance server; and a communication device for implementing online maintenance in a communication network, the communication device connecting to the user terminal and the online maintenance server respectively, the communication device configured to perform a process, comprising:

detecting a maintenance request sent from the user terminal during a communication procedure; and recording communication data going through the communication device itself when the maintenance request has been detected; and sending the communication data to the online maintenance server for analyzing the communication data to find out a fault reason of the communication network;

wherein the process further comprises:

encapsulating the recorded communication data going through the communication device itself during the communication procedure into an IP package, and sending the IP packet to an online maintenance server;

wherein the IP package comprises: an IP header, a global unique identifier and communication data; and wherein the analyzing the communication data to find out the fault reason of the communication network comprises:

starting, by the online maintenance server, fault reason analysis;

selecting two communication data from the collected communication data for comparison, wherein the two communication data carry global unique identifiers indicating the same communication procedure and are sent from two adjacent communication devices in the communication network, respectively; and determining, by the online maintenance server, that a fault lies in the communication devices having sent the two communication data when the two communication data are different.

* * * * *